Figure 1:
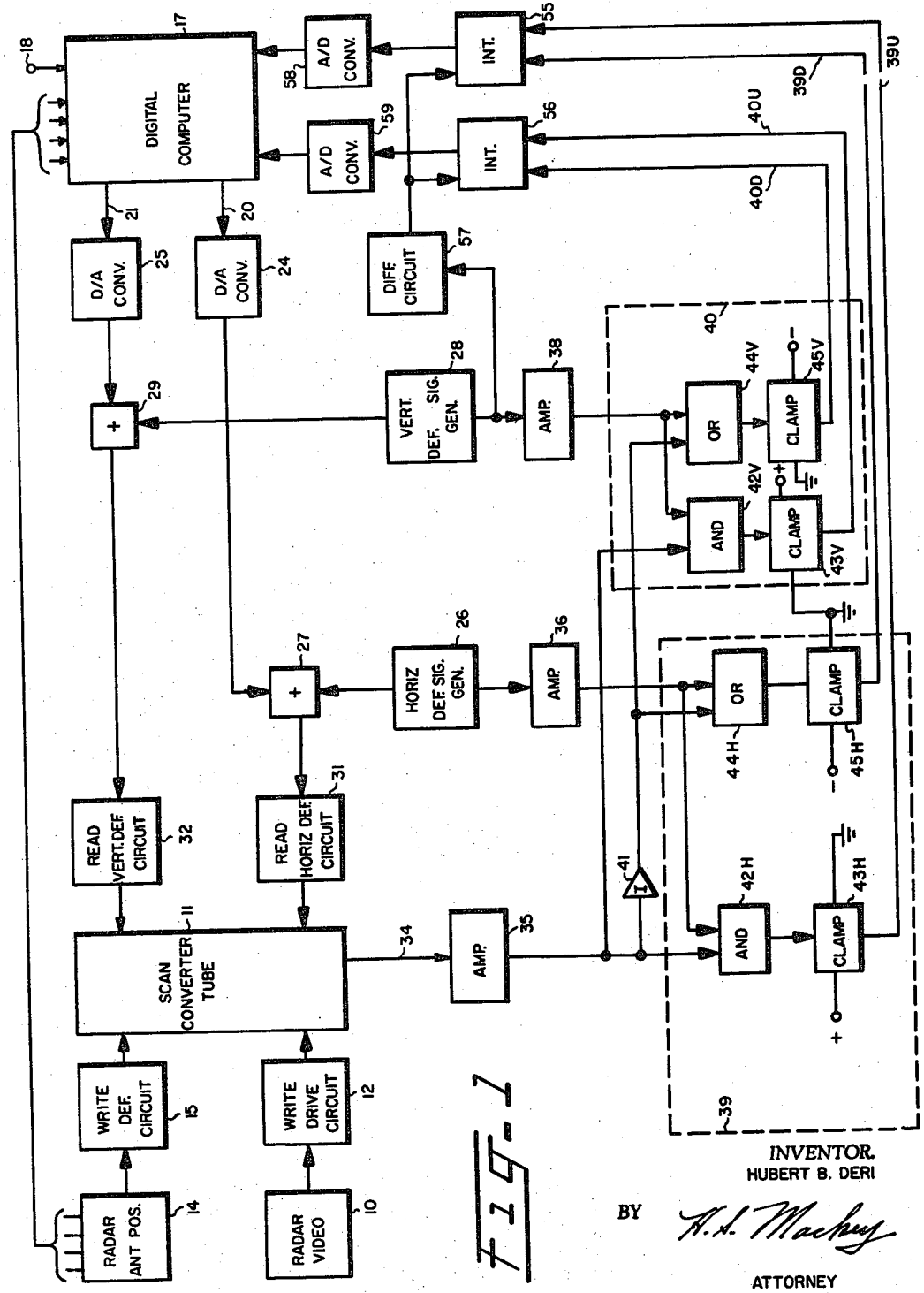

July 21, 1964       H. B. DERI       3,142,057
COORDINATE ERROR SIGNAL GENERATOR
Filed Dec. 4, 1962                  3 Sheets-Sheet 1

INVENTOR.
HUBERT B. DERI
BY
ATTORNEY

July 21, 1964 H. B. DERI 3,142,057
COORDINATE ERROR SIGNAL GENERATOR
Filed Dec. 4, 1962 3 Sheets-Sheet 2

INVENTOR.
HUBERT B. DERI
BY
ATTORNEY

July 21, 1964  H. B. DERI  3,142,057
COORDINATE ERROR SIGNAL GENERATOR
Filed Dec. 4, 1962  3 Sheets-Sheet 3

INVENTOR.
HUBERT B. DERI
BY
ATTORNEY

United States Patent Office 3,142,057
Patented July 21, 1964

3,142,057
COORDINATE ERROR SIGNAL GENERATOR
Hubert B. Deri, Rye, N.Y., assignor to General Precision,
Inc., a corporation of Delaware
Filed Dec. 4, 1962, Ser. No. 242,237
14 Claims. (Cl. 343—7)

This invention relates to radar target tracking devices and more particularly to a coordinate error signal generator suitable for use in a radar target tracking system for supplying two error signals representative of the deviation of the (x) and (y) coordinates of a radar blip from a previously predicted position.

Radar searching is an extremely valuable tool in the field of air traffic control and air surveillance for military or other purposes, since it presents a composite picture of the instantaneous traffic pattern. However, one of the major sources of error in a radar-controlled air traffic system or surveillance system is the inability to identify the blips on the screen.

One solution of the problem requires the attachment of a tracking gate or other indicator to a given blip, once it is identified. The indicator travels with the blip in its passage across the screen thus assuring that the blip will be readily identified. The indicator may be no more than a piece of paper or plastic placed on the face of the tube and moved by a human operator along with the blip it identifies. It is also possible to generate electronically an alpha numeric indicator, which is placed on the screen adjacent to an identified blip and travels with it.

Prior art systems for placing electronically generated alpha numeric indicators on the screen adjacent to an identified blip have several serious drawbacks even though, when working, they perform adequately. In the first place they require a separate set of hardware for each target or blip to be tracked, and are therefore cumbersome and expensive. In addition they are difficult and time-consuming to adjust and maintain, thus greatly increasing the overall cost of operation of a radar installation.

One object of this invention is to provide a coordinate error signal generator for use in a radar tracking system, which is capable of sequentially providing the coordinate positions of a plurality of radar targets.

Another object of the invention is to provide a coordinate signal generator, as set forth above, which is reliable in operation and inexpensive to manufacture.

A further object is to provide a coordinate error signal generator, as set forth above, which is easily adjusted and inexpensive to maintain.

The foregoing and other objects and advantages of the invention will become more apparent from a consideration of the specification and drawings, wherein one embodiment of the invention is described and shown in detail for illustration purposes only.

Figure 2:
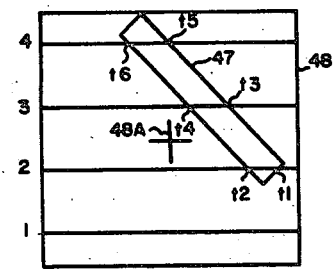

In the drawings:

FIGURE 1 is a block diagram illustrating a novel coordinate error signal generator constructed in accordance wtih the invention, FIGURE 2 illustrates a scanned rectangular area on the storage surface of the scan converter tube which is part of the circuit shown in FIGURE 1, and FIGURES 3–11, inclusive, are graphs illustrating the operation of the novel generator.

In FIGURE 1 radar video signals from a source 10 are applied to a scan converter tube 11, which stores the radar information on a dielectric storage surface located between opposing writing and reading electron guns. Associated with each gun are drive, deflection and focusing circuits, the latter not shown since their operation is conventional and is not altered in any way.

The radar video signal is applied to the write drive circuit 12 and modulates the writing beam in accordance with the radar video signal, while the antenna position from a source 14 is applied to the write deflection circuit 15 to cause the beam to follow the antenna, so that the video signal will be stored in the appropriate location on the storage surface. All of the circuits thus far described are conventional in all respects and result in the writing of radar video signal on the storage surface of scan converter tube 11.

A digital computer 17 has a manual input 18 which is used to insert the predicted (x) and (y) coordinates of a radar target, when it is first identified. Once this information has been entered, the circuit disclosed will follow the target and the computer will provide electric signals which correspond to the instantaneous (x), (y) coordinates of the target. The target area is divided into four quadrants, and the coordinates of those targets in the first quadrant will have positive signs. In the second quadrant the (x) coordinate will be positive, the (y) negative. In the third quadrant both (x) and (y) are negative, and in the fourth (x) is negative and (y) is positive.

The radar antenna position source 14 provides four outputs for indicating the quadrant the antenna is in. This may be accomplished by a commutator on the antenna divided into segments corresponding to the four quadrants. The four lines from source 14 are applied to computer 17 and select only those coordinates which are located in the quadrant immediately behind the quadrant being searched by the radar. This provides the strongest signal on the storage surface of the scan converter tube, since the scanning rate of the radar antenna is set to provide a sufficient decay time on the storage surface in one complete cycle of operation, so that target returns written during a previous antenna rotation will not contribute to the output of the system. How this is effected will be clearer after the description has been completed.

Computer 17 provides two sets of digital signals, one via a path 20, which indicates the predicted (x) or horizontal coordinate of an identified target, and the other via a path 21, which indicates the predicted (y) or vertical coordinate of the above identified target. The identified target will be located in the quadrant immediately behind the antenna quadrant, and is selected from the computer memory at random. All targets having the same coordinate signs will be examined during the time the antenna sweeps this particular quadrant. Thus it is seen that the maximum number of targets, which may be handled per quadrant, is a function of the antenna quadrant sweep time and the rate at which each target is processed. Both of these factors will vary considerably with design or ultimate utilization of the system and, therefore, will not be set forth in detail, since the basic function of the system remains unchanged for different operating parameters.

The digital signals supplied via paths 20 and 21 are converted by digital-to-analog converters 24 and 25, respectively, to analog voltages corresponding in magnitude and polarity to the numeric value and sign of the digital signal. A horizontal deflection signal generator 26 provides a limited linear sawtooth sweep voltage, which is added to the analog voltage from converter 24 in an adding circuit 27; and a vertical deflection signal generator 28 provides a limited linear sawtooth sweep voltage, which is added to the analog voltage from converter 25 in an adding circuit 29. The repetition rate of the horizontal sweep voltage is much higher than that of the vertical sweep voltage; their duration and relative phase must be chosen, as is well known in the television art, to result in the scanning by the beam of a small rectangular area on the read side of the dielectric storage surface of the scan converter tube.

The output of adding circuit 27 is applied to the read horizontal deflection circuit 31 of tube 11, while the output of adding circuit 29 is applied to the read vertical deflection circuit 32 of tube 11. The drive circuit for the read function is continuously energized and is, therefore, not separately shown but included with tube 11. With this arrangement a small rectangular area centered at the predicted target point on the storage surface is scanned. The size of the area will be a function of the sweep voltages supplied by generators 26 and 28, and the location a function of the predicted coordinates supplied by computer 17.

Tube 11 provides a read current output on a conductor 34 which is modulated by the target. That is, when the read beam transverses an area of the tube storage surface on which a target has been written, the output current on conductor 34 will change and will fall back to its prior value, once the read beam passes beyond the target area. Old targets from previous antenna rotations, which have faded, will provide smaller outputs, which will not be detected.

A clipping amplifier 35 amplifies the read current output on conductor 34 and provides a positive or high level signal only, when a target written in the previous quadrant of antenna rotation is encountered by the read beam, as it scans the storage surface of tube 11. The amplifier is designed to provide a negative or low level output at all other times, even when targets written during previous antenna rotations are encountered, since the output the faded targets produce is insufficient to drive the amplifier.

Two additional clipping amplifiers, 36 and 38, similar to amplifier 35, are connected to deflection generators 26 and 28, respectively, and each provides two levels of output. The first, a negative or low level, occurs during the first half of the sweep, and the second, a positive or high level, occurs during the second half of the sweep. For ease of description the low level output of amplifiers 35, 36 and 38 will be called zero and the high level output one; see FIGURES 3–5, inclusive, where the outputs of amplifiers 35, 36 and 38, respectively, are graphically illustrated. It should be noted that amplifier 35 will provide a one output, when the read beam impinges on an area on the tube storage surface where a target was written in the previous quadrant of antenna scan and zero output for any other condition.

The output from amplifier 35 is applied to one of the input terminals of a pair of identical logic circuits 39 and 40. It is also applied to an inverting circuit 41, which has its output applied to another input terminal of the logic circuits 39 and 40. The output of amplifier 36 is applied to logic circuit 39, while that of amplifier 38 is applied to logic circuit 40.

Logic circuit 39 has a two-input "and" gate 42H connected to amplifiers 35 and 36. The output of gate 42H is connected to a clamping circuit 43H, which provides a positive voltage, when both inputs to "and" gate 42H are simultaneously one, and a zero or ground voltage at all other times. In addition a two-input "or" gate 44H is connected to amplifier 36 and to inverting circuit 41. The output of gate 44H is connected to a clamping circuit 45H which provides a negative voltage, when the outputs of amplifiers 35 and 36 are both simultaneously positive and negative, respectively, and zero or ground voltage at all other times. That is to say, the output of "or" circuit 44H can only drop to its low level and so be clamped at a negative level by the clamp 45H, when both inputs thereto are at the low level; one input consisting of the direct output of amplifier 36, while the other consists of the inverted output of amplifier 35. The outputs of clamps 43H and 45H on conductors 39U and 39D, respectively, are connected to an integrating circuit 55.

Logic circuit 40 is identical to circuit 39 and has a two-input "and" gate 42V connected to amplifiers 35 and 38 with its output connected to a clamping circuit 43V identical to 43H and a two-input "or" gate 44V connected to inverter 41 and amplifier 38. The output of "or" gate 44V is connected to a clamping circuit 45V, which is identical to clamping circuit 45H. The outputs of clamps 43V and 45V on conductors 40U and 40D, respectively, are connected to an integrating circuit 56. Integrators 55 and 56 are identical and provide output signals proportional to the time integrals of the sums of their inputs, representing the errors in the $(x)$ and $(y)$ coordinates, respectively, from the predicted location. In addition they also indicate the direction of the error by the polarity of the error signals. That is, the total error is proportional to the net difference in electrical charge received or withdrawn on the U and D inputs. If U predominates, the sign of the error is positive, and if D predominates, the sign is negative.

A differentiating circuit 57 responsive to the output of vertical deflection signal generator 28 provides a pulse at the end of the vertical scan for resetting integrators 55 and 56 so they will be at zero, when processing of the next target is started.

Two analog-to-digital converters 58 and 59 are connected to the outputs of integrators 55 and 56, respectively, for converting the final output error signal from the integrators into digital form for use in computer 17. In practice a single converter may be used and time-shared to reduce the cost. The signals from the integrators are converted to digital numbers, corresponding to the magnitude of the analog error signals, and include a sign digit for indicating the direction of the deviation or error.

*Operation*

The radar video picture is written on the storage surface of the tube, and a small area of the tube 48, shown in FIGURE 2, the location of which is determined by the $(x)$ and $(y)$ coordinates provided by computer 17, is scanned from left to right and from the bottom to the top by the reading beam. The four lines numbered 1–4, inclusive, shown in FIGURE 2, represent the path of the scanning beam with the retrace eliminated to avoid cluttering the drawing.

In practice many more horizontal lines will be employed per scan. Four only are shown here, however, in order to graphically illustrate the outputs of amplifiers 35, 36 and 38 shown in FIGURES 3, 4 and 5, respectively; the outputs of logic circuits 39 and 49 shown in FIGURES (6 and 7), and (9 and 10), respectively; and the outputs of integrators 55 and 56 shown in FIGURES 8 and 11, respectively.

The target 47 is shown within the area 48. The target in this instance, in order to simplify the description, is shown as a rectangle; however, it may assume any irregular or unsymmetric shape and in most instances will be so shaped. The shape of the target area is immaterial, since the system measures the deviation of the centroid or center of gravity of the plane area defined by the radar return on the storage surface from the center 48A of the scanned area 48, the position of which corresponds to the predicted coordinates supplied by computer 17.

Figures 6, 7, 8:
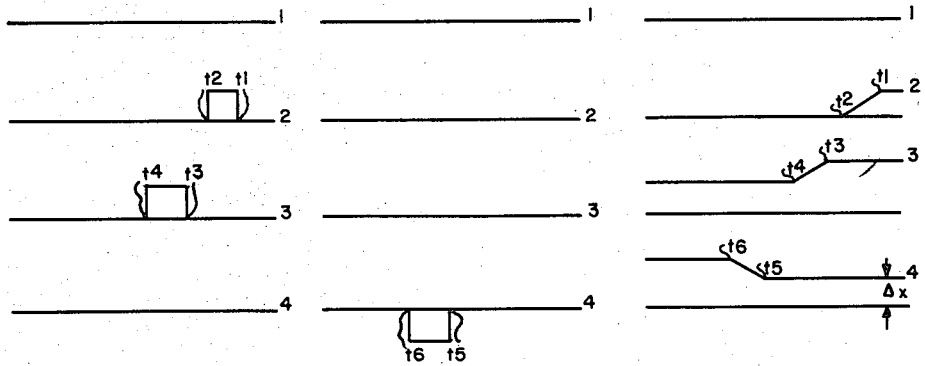
Figures 9, 10, 11:
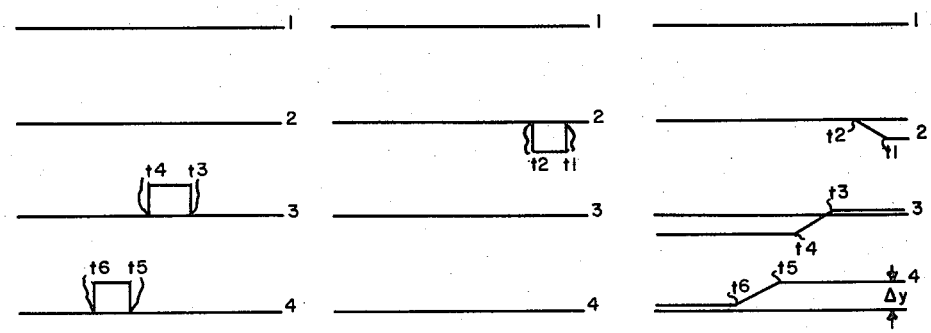

In each of FIGURES 3–11, inclusive, four graphs are shown. These graphs in order illustrate the outputs of each of the above-identified components for the four horizontal sweeps. In FIGURE 8 the distance above the horizontal zero reference line at the termination of the last sweep is proportional to the $(x)$ coordinate of the deviation of the centroid or center of gravity of target 47 from its predicted position and is labeled $\Delta x$, while in FIGURE 11 the distance above the horizontal zero reference line at the termination of the last sweep is proportional to the $(y)$ coordinate of the deviation of the centroid or center of gravity of target 47 from its predicted position and is labeled $\Delta y$.

Figure 3:
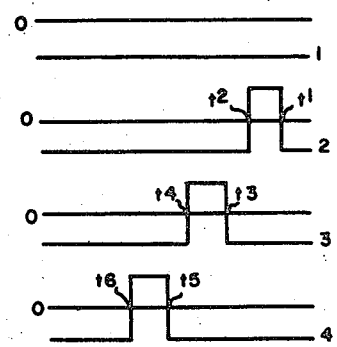

A better understanding of the operation is possible by a careful examination of FIGURES 2-11. FIGURE 2 illustrates, as previously pointed out, the scanned area 48 which includes target 47. The output of amplifier 35 is shown in FIGURE 3 for each of the four beam scans. During the first scan no target is encountered by the beam and the amplifier 35 output is negative for the entire first line. In the second line a target is first encountered at time $t_2$, whereupon the output of amplifier 35 goes positive and remains positive until time $t_1$, when it goes negative again. The output of amplifier 35 goes negative at this point, because the scanning beam no longer impinges on the target 47. During the third scan the output of amplifier 35 is negative until time $t_4$, when the read beam impinges on target 47, and remains positive until time $t_3$, when the read beam leaves the target. During the fourth and final scan the output of amplifier 35 is negative until time $t_6$, when it goes positive, and remains positive until time $t_5$, when it becomes negative, after the read beam leaves target 47.

Figure 4:
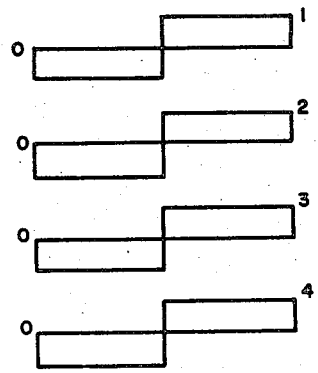
Figure 5:
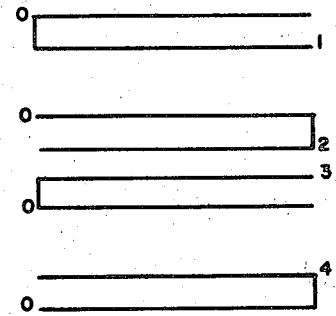

FIGURE 4 illustrates the output of amplifier 36 during the four scans. Here the output is negative during the first half of each scan and positive during the last half of each scan.

FIGURES 6 and 7 illustrate the outputs of logic circuit 39 on conductors 39U and 39D, respectively. During the first scan the output on both conductors is zero since the input to "and" gate 42H from amplifier 35 is negative throughout the entire scan and a positive output can only be derived on conductor 39U when both inputs to "and" gate 42H are simultaneously positive. In a like manner the output, FIGURE 7, on conductor 39D during the first scan is zero since the output can only be negative, when the outputs of amplifiers 35 and 36 are simultaneously positive and negative, respectively.

During the second scan conductor 39U goes from zero to positive at $t_2$ and from positive to zero at $t_1$, since only between $t_2$ and $t_1$ are both inputs to "and" gate 42H simultaneously positive. The output on conductor 39D, FIGURE 7, remains zero, since at no time during the scan are the outputs of amplifiers 35 and 36 simultaneously positive and negative, respectively.

During the third scan conductor 39U goes from zero to positive at time $t_4$ and from positive to zero at time $t_3$, since the inputs to "and" gate 42H are simultaneously positive only during this time, while conductor 39D remains zero throughout the scan, since the outputs of amplifiers 35 and 36 are not at any time simultaneously positive and negative, respectively.

During the fourth and final scan the output of logic circuit 39 on conductor 39U remains zero throughout the scan because the outputs of amplifiers 35 and 36 applied to "and" gate 42H are never simultaneously positive. The output on conductor 39D is zero except between times $t_6$ and $t_5$, when it goes negative, since only during the interval $t_6$ to $t_5$ are the outputs of amplifiers 35 and 36 simultaneously positive and negative, respectively.

Integrator 55, the output of which is shown in FIGURE 8, remains at zero during the first scan, since it receives no positive or negative charging current on either conductor 39U or 39D. During the second scan the output of the integrator 55 becomes more positive between $t_2$ and $t_1$, since it receives a positive charging current on conductor 39U. In the third scan it becomes more positive again between $t_4$ and $t_3$, because it receives a positive charging current on conductor 39U; and during the fourth and final scan it becomes more negative between $t_6$ and $t_5$, because it receives a negative charging current on conductor 39D. The final voltage labeled $\Delta x$ in FIGURE 8 is proportional to the displacement in the $(x)$ direction of the center of gravity of target 47 from point 48A which is the predicted location of the center of gravity of the target. This analog error signal is processed as previously described and applied to computer 17.

From the above discussion it should be obvious that conductor 39U can only be positive during the second half of each horizontal sweep and then only, when the read beam impinges on the target 47. Likewise conductor 39D can only be negative during the first half of each horizontal sweep and then only, if the read beam encounters or impinges on target 47. Thus the target area to the left of vertical center line of the scanned area is integrated in the negative direction, and the target area to the right of the scanned area is integrated in the positive direction. The two integrations are instantaneously summed, and the net charge represented by the output voltage of integrator 55 is proportional to the displacement of the centroid of the target area from the vertical center line of the scanned area in $(x)$ direction.

The determination of the error in the $(y)$ direction, or $\Delta y$, is similar to the determination of $\Delta x$ described above. The only difference being the substitution of the output of amplifier 38 for amplifier 36. Thus the target area below the horizontal center line of the scanned area is integrated in the negative direction, and the target area above the said center line is integrated in the positive direction. The two integrations are instantaneously summed, and the net charge represented by the output voltage $\Delta y$, FIGURE 11, of integrator 56 is proportional to the displacement of the centroid of the target area from the horizontal center line of the scanned area in the $(y)$ direction.

With the error signals supplied by integrators 55 and 56 via digital-to-analog converters 58 and 59, respectively, computer 17 has all the necessary information to predict with a great deal of accuracy the position of the target in the next antenna sweep. It is essential that the computation used be as precise as possible, since the accuracy of predictions to a great extent determines the size of the area 48 which must be examined, and the smaller area 48 can be made the less difficulty will be encountered due to interference from other targets being found nearby. These other targets constitute noise and prevent a determination of the error which requires that the target, which is being tracked, is found to be the only one inside the area 48.

The detection of multiple targets and the method of operation of the computer are not part of the invention and are therefore not disclosed here, since their disclosure would tend to obscure the invention. In addition the particular predictive computations used in a system similar to that herein disclosed is a matter of choice, and are likely to be similar to methods of computation used in other tracking systems using more conventional means. Therefore, any discussion of a set of predictive formulas at this time would only obscure the invention, since it would necessitate the introduction of a great deal of matter not pertinent to this invention.

While only one embodiment of the invention has been shown and described in detail for illustration purposes, applicant wishes it clearly understood that his invention is not limited to the specific details disclosed.

What is claimed is:

1. A coordinate error signal generator for use in a radar target tracking system comprising,
   a scan converter tube including, a read current output circuit, and write and read circuits, first means for connecting search radar return signals to said write circuit to write the radar picture on the tube, second means connected to said read circuit for providing scanning signals to said circuit for symmetrically scanning a small area of the tube about the predicted coordinates of a radar target, and means responsive to the tube read output circuit and the second means for detecting any deviation of the location of the actual radar target received from the predicted location and for providing two error signals corresponding to the errors in the $(x)$ and $(y)$ predicted coordinates.

2. A coordinate error signal generator for use in a radar target tracking system comprising, a scan converter tube including, a video write input circuit, a read current output circuit, and write and read deflection circuits, first means for connecting search radar return signals to the video write input circuit, and a signal representing the antenna position to the write deflection circuit to write the radar picture on the tube, second means connected to said read deflection circuit for providing scanning signals to said circuit for symmetrically scanning a small area of the tube about the predicted coordinates of a radar target, and means responsive to the tube read output circuit and the second means for detecting any deviation of the location of the actual radar target received from the predicted location and for providing two error signals corresponding to the errors in the $(x)$ and $(y)$ predicted coordinates.

3. A coordinate error signal generator for use in a radar target tracking system comprising, a scan converter tube including, a read current output circuit, and write and read circuits, first means for connecting search radar return signals to said write circuit to write the radar picture on the tube, second means for receiving electric signals corresponding to the $(x)$ and $(y)$ coordinates of a predicted location of a given radar target and for supplying scanning signals to said read circuit for symmetrically scanning a small area of the tube about the predicted coordinates of the radar target, and means responsive to the tube read output circuit and the second means for detecting any deviations of the location of the received radar target from the predicted location and for providing two error signals corresponding to the errors in the $(x)$ and $(y)$ predicted coordinates.

4. A coordinate error signal generator for use in a radar target tracking system comprising, a scan converter tube including, a video write input circuit, a read current output circuit, and write and read deflection circuits, first means for connecting search radar return signals to the video write input circuit, and a signal representing the antenna position to the said write deflection circuit to write the radar picture on the tube, second means for receiving electric signals corresponding to the $(x)$ and $(y)$ coordinates of a predicted location of a given radar target and for supplying scanning signals to said read deflection circuit for symmetrically scanning a small area of the tube about the predicted coordinates of the radar target, and means responsive to the tube read output circuit and the second means for detecting any deviations of the location of the received radar target from the predicted location and for providing two error signals corresponding to the errors in the $(x)$ and $(y)$ predicted coordinates.

5. A coordinate error signal generator for use in a radar target tracking system comprising, a scan converter tube including a read current output circuit, and write and read circuits, first means for connecting search radar return signals to said write circuit to write the radar picture on the tube, second means for generating scanning signals, third means for receiving electric signals corresponding to the $(x)$ and $(y)$ coordinates of a predicted location of a given radar target and the said scanning signals and for combining said signals, the output of said third means being connected to the read circuit to provide a symmetrical scan of a small area of the tube about the predicted coordinates of the radar target, and means responsive to the tube read output circuit and the second means for detecting any deviation of the location of the received radar target from the predicted location and for providing two error signals corresponding to the errors in the $(x)$ and $(y)$ predicted coordinates.

6. A coordinate error signal generator for use in a radar target tracking system comprising, a scan converter tube including a video write input circuit, a read current output circuit, and write and read deflection circuits, first means for connecting search radar return signals to the video write input circuit, and a signal representing the antenna position to the said write deflection circuit to write the radar picture on the tube, second means for generating scanning signals, third means for receiving electric signals corresponding to the $(x)$ and $(y)$ coordinates of a predicted location of a given radar target and the said scanning signals and for combining said signals, the output of said third means being connected to the read deflection circuit to provide a symmetrical scan of a small area of the tube about the predicted coordinates of the radar target, and means responsive to the tube read output circuit and the second means for detecting any deviation of the location of the received radar target from the predicted location and for providing two error signals corresponding to the errors in the $(x)$ and $(y)$ predicted coordinates.

7. A coordinate error signal generator for use in a radar target tracking system comprising, a scan converter tube including, a read current output circuit, and write and read circuits, means for connecting search radar return signals to said write circuit to write the radar picture on the tube, means for receiving separate electric signals corresponding to the $(x)$ and $(y)$ coordinates respectively of a predicted location of a given radar target, means for generating a horizontal sweep voltage, means for generating a vertical sweep voltage, first circuit means for combining the signal corresponding to the $(x)$ coordinate of the predicted target location and the horizontal sweep voltage and applying the combined signal to the read circuit, second circuit means for combining the signal corresponding to the $(y)$ coordinate of the predicted target location and the vertical sweep voltage and applying the combined signal to the read circuits, means responsive to the read current output circuit and the horizontal sweep voltage for detecting the deviation of the $(x)$ coordinate of the actual radar target from the predicted $(x)$ coordinate, and means responsive to the read current output circuit and the vertical sweep voltage for detecting the deviation of the $(y)$ coordinate of the actual radar target from the predicted $(y)$ coordinate.

8. A coordinate error signal generator for use in a radar target tracking system comprising, a scan converter tube including, a read current output circuit, and write and read circuits, means for connecting search radar return signals to said write circuit to write the radar picture on the tube, means for receiving separate electric signals corresponding to the (x) and (y) coordinates, respectively, of a predicted location of a given radar target, means for generating a horizontal sweep signal, means for generating a vertical sweep signal, first means for adding the signal corresponding to the (x) coordinate of the predicted target location and the horizontal sweep signal and applying the sum signal to the read circuit, second means for adding the signal corresponding to the (y) coordinate of the predicted target location and the vertical sweep signal and applying the sum signal to the read circuit, third means responsive to the read current output circuit for providing a first discrete output level when the tube read beam does not impinge on a written radar target and a second discrete output level when the tube read beam impinges on a written radar target, fourth means responsive to the horizontal sweep signal for providing a first discrete output level during the first half of each horizontal sweep cycle and a second discrete output level during the second half of the horizontal sweep cycle, fifth means responsive to the vertical sweep signal for providing a first discrete output level during the first half of the vertical sweep cycle and a second discrete output level during the second half of the vertical sweep cycle, means responsive to the third and fourth means for detecting any deviation of the (x) coordinate of the actual radar target from the predicted (x) coordinate, and means responsive to third and fifth means for detecting any deviation of the (y) coordinate of the actual radar target from the predicted (y) coordinate.

9. A coordinate error signal generator as set forth in claim 8 in which the means responsive to the third and fourth means and the means responsive to the third and fifth means each include, sixth means for providing a first output level of one polarity when the inputs thereto are both simultaneously at the aforesaid second discrete level, seventh means for providing a second output level of opposite polarity to that provided by said first means above when the inputs thereto are both simultaneously opposite and the input from the said third means is at the aforesaid second discrete level, and a bidirectional integrator for integrating the outputs from said sixth and seventh means.

10. A coordinate error signal generator as set forth in claim 9 in which said sixth means includes an "and" gate for receiving the input and a clamping circuit responsive to the "and" gate output for limiting the output from the said "and" gate to a reference potential and a potential above said reference potential, and said seventh means includes an "or" gate for receiving the input and a clamping circuit responsive to the "or" gate output for limiting the output from the said "or" gate to the above said reference potential and a potential below said reference potential by an amount substantially equal to the amount said potential from the sixth means is above the said reference potential.

11. A coordinate error signal generator for use in a radar target tracking system comprising, a scan converter tube including, a video write input circuit, a read current output circuit, and write and read deflection circuits, means for connecting search radar return signals to the video write input circuit, and a signal representing the antenna position to the write deflection circuit to write the radar picture on the tube, means for receiving separate electric signals corresponding to the (x) and (y) coordinates respectively of a predicted location of a given radar target, means for generating a horizontal sweep voltage, means for generating a vertical sweep voltage, first circuit means for combining the signal corresponding to the (x) coordinate of the predicted target location and the horizontal sweep voltage and applying the combined signal to the read deflection circuit, second circuit means for combining the signal corresponding to the (y) coordinate of the predicted target location and the vertical sweep voltage and applying the combined signal to the read deflection circuit, means responsive to the read current output circuit and the horizontal sweep voltage for detecting the deviation of the (x) coordinate of the actual radar target from the predicted (x) coordinate, and means responsive to the read current output circuit and the vertical sweep voltage for detecting the deviation of the (y) coordinate of the actual radar target from the predicted (y) coordinate.

12. A coordinate error signal generator for use in a radar target tracking system comprising, a scan converter tube including, a video write input circuit, a read current output circuit, and write and read deflection circuits, means for connecting search radar return signals to the video write input circuit, and a signal representing the antenna position to the write deflection circuit to write the radar picture on the tube, means for receiving separate electric signals corresponding to the (x) and (y) coordinates, respectively, of a predicted location of a given radar target, means for generating a horizontal sweep signal, means for generating a vertical sweep signal, first means for adding the signal corresponding to the (x) coordinate of the predicted target location and the horizontal sweep signal and applying the sum signal to the read deflection circuit, second means for adding the signal corresponding to the (y) coordinate of the predicted target location and the vertical sweep signal and applying the sum signal to the read deflection circuit, third means responsive to the read current output circuit for providing a first discrete output level when the tube read beam does not impinge on a written radar target and a second discrete output level when the tube read beam impinges on a written radar target, fourth means responsive to the horizontal sweep signal for providing a first discrete output level during the first half of each horizontal sweep cycle and a second discrete output level during the second half of the horizontal sweep cycle, fifth means responsive to the vertical sweep signal for providing a first discrete output level during the first half of the vertical sweep cycle and a second discrete output level during the second half of the vertical sweep cycle, means responsive to the third and fourth means for detecting any deviation of the (x) coordinate of the actual radar target from the predicted (x) coordinate, and means responsive to third and fifth means for detecting any deviation of the (y) coordinate of the actual radar target from the predicted (y) coordinate.

13. A coordinate error signal generator as set forth in claim 12 in which the means responsive to the third and fourth means and the means responsive to the third and fifth means each include, sixth means for providing a first output level of one polarity, when the inputs thereto are both simultaneously at the aforesaid second discrete level, seventh means for providing a second output level of opposite polarity to that provided by said first means above when the inputs thereto are both simultaneously opposite and the input from the said third means is at the aforesaid second discrete level, and a bidirectional integrator for integrating the outputs from said sixth and seventh means.

14. A coordinate error signal generator as set forth in claim 13 in which said sixth means includes an "and" gate for receiving the input and a clamping circuit responsive to the "and" gate output for limiting the output from the said "and" gate to a reference potential and a potential above said reference potential, and said seventh means includes an "or" gate for receiving the input and a clamping circuit responsive to the "or" gate output for limiting the output from the said "or" gate to the above said reference potential and a potential below said reference potential by an amount substantially equal to the amount said potential from the sixth means is above the said reference potential.

No references cited.